(12) United States Patent
Kim

(10) Patent No.: US 10,024,403 B2
(45) Date of Patent: Jul. 17, 2018

(54) AUTOMATIC BELT TENSIONER FOR ENGINE

(71) Applicant: HYUNDAI MOTOR COMPANY, Seoul (KR)

(72) Inventor: Sang Yun Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 446 days.

(21) Appl. No.: 14/932,518

(22) Filed: Nov. 4, 2015

(65) Prior Publication Data

US 2016/0273622 A1 Sep. 22, 2016

(30) Foreign Application Priority Data

Mar. 20, 2015 (KR) .................. 10-2015-0038583

(51) Int. Cl.
| | |
|---|---|
| *F16H 7/12* | (2006.01) |
| *F16H 7/08* | (2006.01) |
| *F02B 67/06* | (2006.01) |
| *F02N 11/00* | (2006.01) |

(52) U.S. Cl.
CPC ........... *F16H 7/1209* (2013.01); *F02B 67/06* (2013.01); *F02N 11/00* (2013.01); *F16H 7/0829* (2013.01); *F16H 7/1218* (2013.01); *F16H 2007/081* (2013.01); *F16H 2007/0806* (2013.01); *F16H 2007/0865* (2013.01); *F16H 2007/0874* (2013.01); *F16H 2007/0893* (2013.01); *F16H 2007/0897* (2013.01)

(58) Field of Classification Search
CPC ....... F16H 2007/081; F16H 2007/0874; F16H 7/1281; F16H 2007/0846; B62M 9/16
USPC .......................................... 474/134
See application file for complete search history.

(56) References Cited

U.S. PATENT DOCUMENTS

| | | | | |
|---|---|---|---|---|
| 525,118 | A | * | 8/1894 | Riker .................... F16H 7/1281 105/105 |
| 959,667 | A | * | 5/1910 | White ........................... 242/154 |
| 976,115 | A | * | 11/1910 | Bard ............................. 180/443 |

(Continued)

FOREIGN PATENT DOCUMENTS

| | | |
|---|---|---|
| JP | H11-141630 | 5/1999 |
| JP | P2003-521639 A | 7/2003 |

(Continued)

*Primary Examiner* — Henry Y Liu
(74) *Attorney, Agent, or Firm* — Brinks Gilson & Lione (57) ABSTRACT

The present disclosure provides an automatic belt tensioner for an engine which automatically adjusts the tension of a belt for transmitting rotational force between an engine and an auxiliary machinery component. The automatic belt tensioner includes: a tensioner body mounted at the engine side and having an internal space; a tension spring installed in the internal space of the tensioner body; first and second damping shoes coupled by the tension spring; a first arm having a hinge portion coupled to the first damping shoe; a second arm having a hinge portion coupled to the second damping shoe; and idlers rotatably mounted on the first and second arms, respectively, and also supporting the belt. The first hinge portion which is a rotation center of the first arm and the second hinge portion which is a rotation center of the second arm are rotatably coupled to the tensioner body.

15 Claims, 9 Drawing Sheets

(56) References Cited

U.S. PATENT DOCUMENTS

| | | | | |
|---|---|---|---|---|
| 4,069,719 | A | * | 1/1978 | Cancilla .................. B62M 9/16 474/134 |
| 4,758,208 | A | * | 7/1988 | Bartos .................. F16H 7/1281 474/111 |
| 6,648,783 | B1 | * | 11/2003 | Bogner ................. F16H 7/1281 474/134 |
| 6,689,001 | B2 | * | 2/2004 | Oliver .................. F16H 7/1281 474/109 |
| 7,468,013 | B2 | * | 12/2008 | Di Giacomo ........ F16H 7/1281 474/117 |
| 7,901,310 | B2 | * | 3/2011 | Lolli ..................... F16H 7/1281 474/101 |
| 8,057,334 | B2 | | 11/2011 | Kotzur |
| 8,353,795 | B2 | * | 1/2013 | Montani ............... F16H 7/1281 474/118 |
| 8,821,328 | B2 | * | 9/2014 | Jud ....................... F16H 7/1281 474/134 |
| 2002/0039944 | A1 | * | 4/2002 | Ali ....................... F16H 7/1209 474/135 |
| 2013/0260932 | A1 | | 10/2013 | Adam et al. |

FOREIGN PATENT DOCUMENTS

| | | |
|---|---|---|
| JP | 2008-256183 | 10/2008 |
| KR | 10-2005-0111577 | 11/2005 |
| WO | 2011/002718 A1 | 1/2011 |
| WO | 2012/049030 | 4/2012 |

* cited by examiner

[CROSS-SECTIONAL VIEW TAKEN ALONG LINE B-B]

FIG. 7A

[CROSS-SECTIONAL VIEW TAKEN ALONG LINE C-C]

AUTOMATIC BELT TENSIONER FOR ENGINE

CROSS-REFERENCE TO RELATED APPLICATION

This application claims the benefit of Korean Patent Application No. 10-2015-0038583, filed on Mar. 20, 2015, which is hereby incorporated by reference in its entirety.

FIELD

The present disclosure relates to an automatic belt tensioner for an engine.

BACKGROUND

The statements in this section merely provide background information related to the present disclosure and may not constitute prior art.

In general, a hybrid vehicle is a vehicle that travels by using an engine and a motor as driving sources, and an environmentally-friendly vehicle that travels by using both energy generated from fossil fuel and electrical energy, thereby reducing exhaust gas and improving fuel efficiency.

Figure 1:
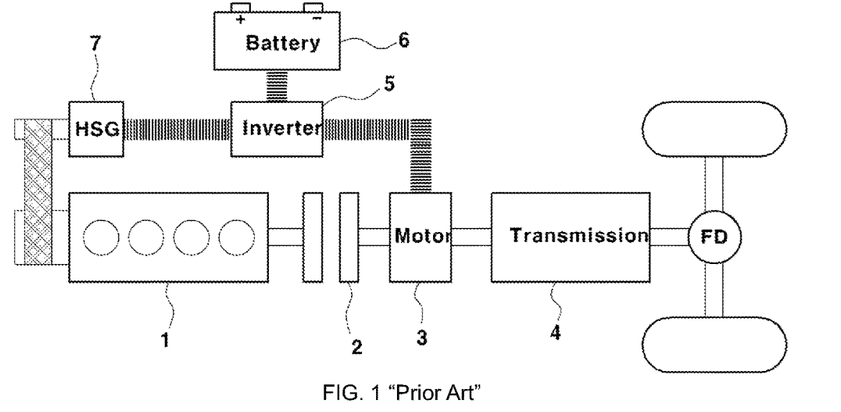
FIG. 1 is a configuration diagram schematically illustrating a power train of a general hybrid vehicle.

FIG. 1 schematically illustrates an example of configurations of an engine and a driving motor that are driving sources for driving the hybrid vehicle, and a hybrid power train that includes an engine clutch and a transmission for power transmission.

As illustrated in FIG. 1, a configuration of a power train including a driving system such as an engine, a driving motor, and a power transmission device in the hybrid vehicle includes an engine 1 and a driving motor 3 which are driving sources for driving the vehicle and disposed in series, an engine clutch 2 which is interposed between the engine 1 and the driving motor 3 to transmit power or block power transmission between the engine 1 and the driving motor 3, an inverter 5 which drives and controls the driving motor 3, a transmission 4 which adjusts speed of power of the engine 1 and the driving motor 3 and transmit power to a driving shaft, and a hybrid starter and generator (HSG) 7 which is connected with the engine 1 so as to be able to transmit power to the engine 1.

Among the above configurations, the engine clutch 2 transmits power or blocks power transmission between the engine 1 and the driving motor 3 through a lock-up operation and an opening operation using hydraulic pressure.

A battery 6, which is a power source (electric power source) for the driving motor 3, is connected to the motor through the inverter 5 so as to be charged and discharged, and the inverter 5 converts a direct current of the battery 6 into a three-phase alternating current and applies the three-phase alternating current to the motor to drive the motors 3 and 7.

The hybrid starter and generator (HSG) 7, which is typically connected to the engine through the belt, is provided as a motor with a capacity smaller than that of the driving motor 3, and starts the engine by transmitting its own power to the engine 1 through the belt or generates electricity by using rotational force transmitted from the engine, and the battery 6 is charged with electrical energy that is produced by the operation of generating electricity.

A system in which the hybrid starter and generator (HSG) supplements engine output as a driving source for driving the vehicle without using the driving motor in accordance with the type of vehicle is also known.

A pulley of the hybrid starter and generator is connected with a crank pulley mounted on a crank shaft (C/S) through the belt so as to be able to transmit power therebetween, and the hybrid starter and generator is operated by the motor, and transmits rotational force to the crank shaft through the belt to start the engine.

The hybrid starter and generator is operated as an electric generator during the operation of the engine, and generates electrical energy by receiving rotational force of the engine, that is, rotational force of the crank shaft through the belt, and the battery is charged.

In particular, the hybrid starter and generator is operated as a motor while the vehicle travels, and transmits rotational force to the engine side through the belt, such that torque boosting in which torque of the hybrid starter and generator is provided as driving torque for driving the vehicle may be carried out, and the hybrid starter and generator is operated as an electric generator when the vehicle is braked or coasting, such that energy regeneration in which electrical energy is produced by rotational force transmitted from the engine through the belt and the battery is charged may be carried out.

Meanwhile, when auxiliary machinery components, which includes the hybrid starter and generator (HSG) and are connected with the engine through the belt so as to be able to transmit power, are applied to the engine, an automatic tensioner is mounted to automatically adjust and maintain tension of the belt, that is, the auxiliary machinery belt.

In the engine for a hybrid vehicle, the hybrid starter and generator receives power from the engine and transmits power to the engine through the belt, and a tightened state and a released state of the auxiliary machinery belt are continuously changed depending on an operational condition of the engine and an operational condition of the hybrid starter and generator.

Figure 2:
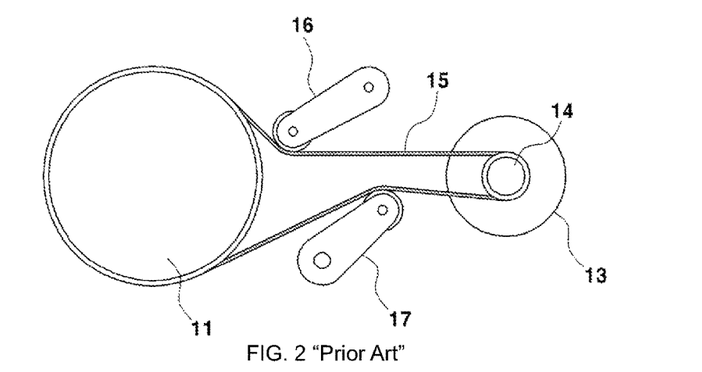
FIG. 2 is a view illustrating a state in which two mechanical automatic tensioners in the related art are mounted on an auxiliary machinery belt connected between a crank pulley and a pulley of a hybrid starter and generator.

Therefore, two or more existing automatic tensioners are sometimes mounted in the engine, and FIG. 2 illustrates an example in which two mechanical automatic tensioners 16 and 17 are mounted on a single auxiliary machinery belt 15 that is connected between a crank pulley 11 and a pulley 14 of the hybrid starter and generator 13.

However, in a case in which the two mechanical automatic tensioners 16 and 17 are mounted, a layout at a mounting portion of the engine side is complicated, and it may be difficult to mount the two automatic tensioners in accordance with the type of engine.

Because the automatic tensioners are applied in a duplicate manner, tension of the belt may be excessively increased, and as a result, there are problems in that fuel efficiency of the vehicle may deteriorate, and weights and costs may be increased.

In order to solve the above problems, a Ω-type tensioner and a Y-type tensioner have been developed and applied.

International Patent Publication No. WO 2012-049030 (Apr. 19, 2012) discloses the Ω-type tensioner, and the Ω-type tensioner is mounted directly on a surface of a component front surface on which a pulley of an auxiliary machinery component such as a hybrid starter and generator is positioned, and supports a belt at both sides of the pulley.

In the Ω-type tensioner, tensioner pulleys (also called idlers), which are mounted at both ends of an arm that is disposed in a 0 shape, are relatively moved to automatically adjust the tension of the belt that is repeatedly tightened and released.

However, we have discovered that because the Ω-type tensioner needs to be mounted directly on the front surface of the hybrid starter and generator, the Ω-type tensioner has disadvantages in terms of a layout and assembly properties.

Figure 3A:
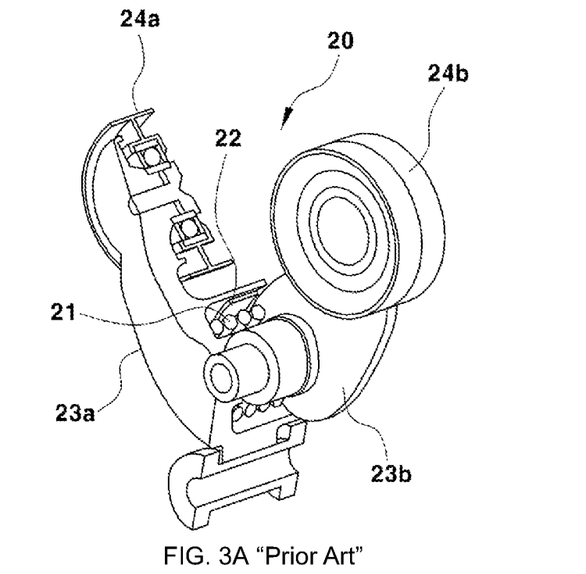
FIGS. 3A and 3B are views illustrating a Y-type tensioner in the related art.
Figure 3B:
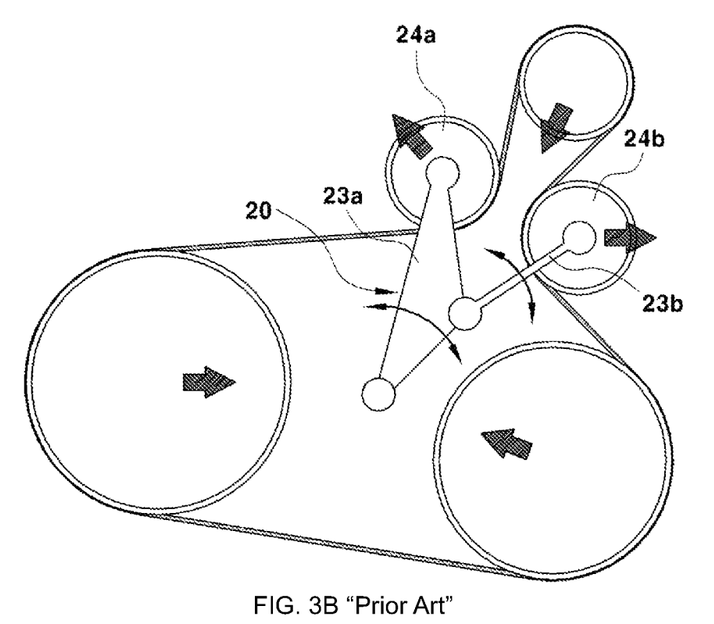

Meanwhile, FIGS. 3A and 3B are views illustrating the Y-type tensioner. As illustrated, a Y-type tensioner 20 is a mechanical tensioner that overall has a Y shape, and has a single tension spring 21, a single damping shoe 22, two arms 23a and 23b which are coupled in a Y shape, and tensioner pulleys 24a and 24b which are mounted at ends of the arms 23a and 23b, respectively, and support a belt 15.

The Y-type tensioner 20 has two pivot points that are rotation centers of the arms 23a and 23b, and the arms 23a and 23b relatively moved based on the two pivot points to adjust tension of the belt 15.

The Y-type tensioner has a large size, and we have discovered that as a result, there are problems in that the Y-type tensioner has a disadvantage in terms of a layout, manufacturing costs are high, the Y-type tensioner is heavy in weight, damping force may deteriorate due to abrasion and the like, and durability of the Y-type tensioner is poor.

SUMMARY

The present disclosure provides an automatic belt tensioner for an engine, which has a simple configuration and a small size, and may reduce weight and manufacturing costs.

The present disclosure provides an automatic belt tensioner for an engine, which may efficiently adjust tension of an auxiliary machinery belt which is variously changed depending on an operational condition of an engine for a hybrid vehicle and an operational condition of a hybrid starter and generator (HSG).

In one aspect, the present disclosure discloses an automatic belt tensioner for an engine, which automatically adjusts tension of a belt for transmitting rotational force between an engine and an auxiliary machinery component, the automatic belt tensioner including: a tensioner body which is mounted at the engine side and has an internal space; a tension spring which is in the form of a coil spring and installed in the internal space of the tensioner body; a first damping shoe and a second damping shoe which are coupled to one end and the other end of the tension spring, respectively; a first arm which has a hinge portion that is formed at one end of the first arm and coupled to the first damping shoe; a second arm which has a hinge portion that is formed at one end of the second arm and coupled to the second damping shoe; and idlers which are rotatably mounted on the first arm and the second arm, respectively, and support the belt, in which the first hinge portion which is a rotation center of the first arm and the second hinge portion which is a rotation center of the second arm are rotatably coupled to the tensioner body in a state in which the first hinge portion and the second hinge portion are concentrically disposed.

Accordingly, according to the automatic tensioner of the present disclosure, it is possible to configure a hybrid starter and generator (HSG) system by using the single automatic tensioner, and thereby improving fuel efficiency of the vehicle by reducing tension of the belt in comparison with a case in which two tensioners are used.

Since the single automatic tensioner may be applied, a mounting position is less restricted, the automatic tensioner may be easily adapted to the current system, and the automatic tensioner may be tuned to match with layouts of various belt system by adjusting a length of the arm.

Since a structure, a shape, and a configuration are simple and the number of components is small, it is possible to reduce a weight, and to reduce manufacturing costs such as material costs and processing costs.

Since damping force is maintained by the two damping shoes, it is possible to reduce damping force and solve the problems in respect to belt noise.

Other aspects and preferred embodiments of the present disclosure are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the present disclosure are discussed infra.

[Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Reference numerals set forth in the Drawings include reference to the following elements as further discussed below:

11: crank pulley
12: compressor pulley
13: hybrid starter and generator (HSG)
14: pulley of hybrid starter and generator or alternator pulley
15: belt
16, 17: mechanical automatic tensioner
20: Y-type automatic tensioner
21: tension spring
22: damping shoe
23a, 23b: arm 24a, 24b: tensioner pulley
110: automatic tensioner
120: tensioner body
121: fastening portion
122: fastening hole
123: pin coupling portion
130: tension spring
131: first damping shoe
132: second damping shoe
133, 134: groove
135: damping material
141: first arm
142: second arm
143, 144: hinge portion
145, 146: protrusion
147: pivot pin
150: idler
151: bearing
152: bushing It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is intended to cover not only the exemplary embodiments, but also various alternatives, modifications, equivalents and other embodiments, which may be included within the spirit and scope of the present disclosure as defined by the appended claims.

Figure 4:
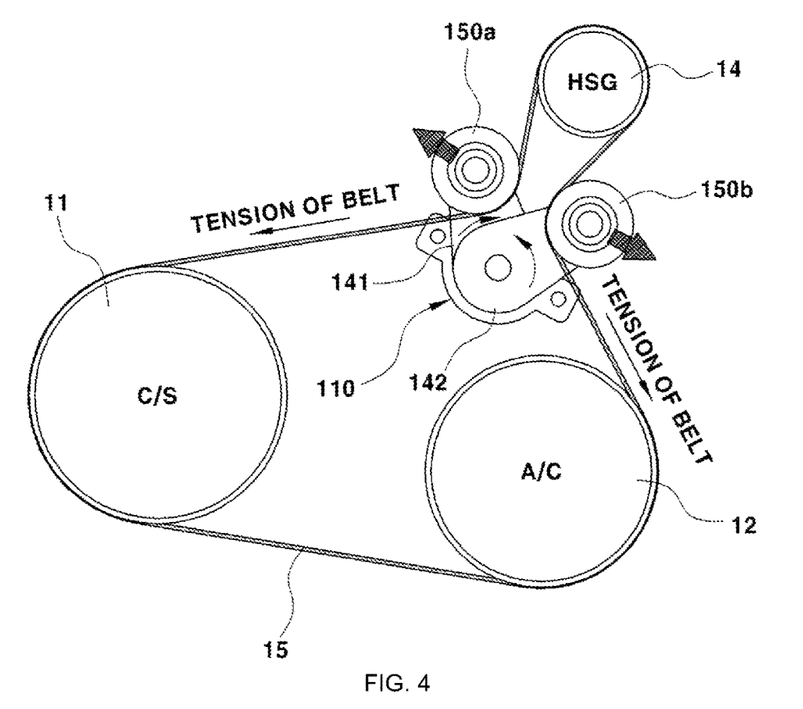
FIG. 4 is a front view illustrating a state in which an automatic tensioner according to an exemplary embodiment of the present disclosure is mounted at a front side of an engine.
Figure 5:
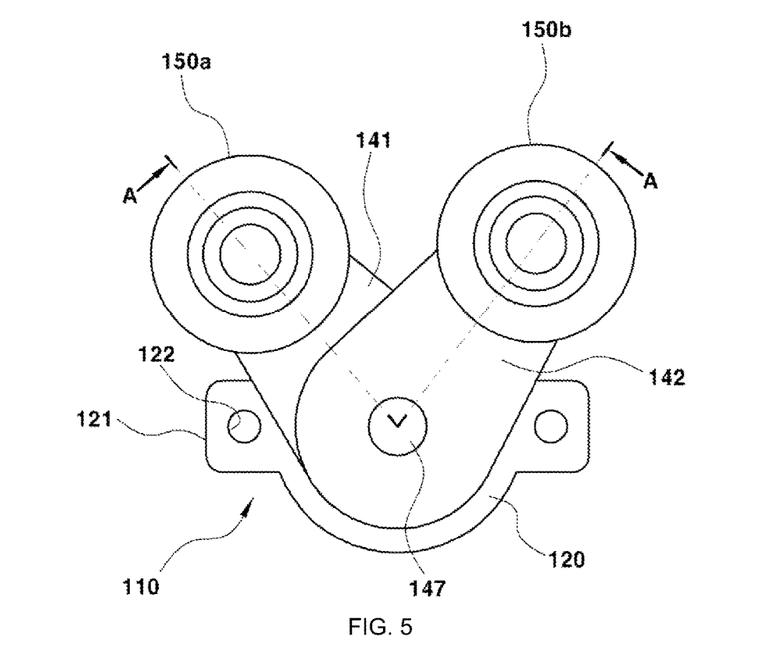
FIG. 5 is a front view illustrating an individual item state of the automatic tensioner according to the exemplary embodiment of the present disclosure.

FIGS. 4 to 7A and 7B are views of an automatic belt tensioner for an engine according to an exemplary embodiment of the present disclosure. FIG. 4 is a front view illustrating a state (nominal position) in which the automatic tensioner according to the exemplary embodiment is mounted at a front side of an engine, and FIG. 5 is a front view illustrating an individual item state of the automatic tensioner according to the exemplary embodiment.

Figure 6:
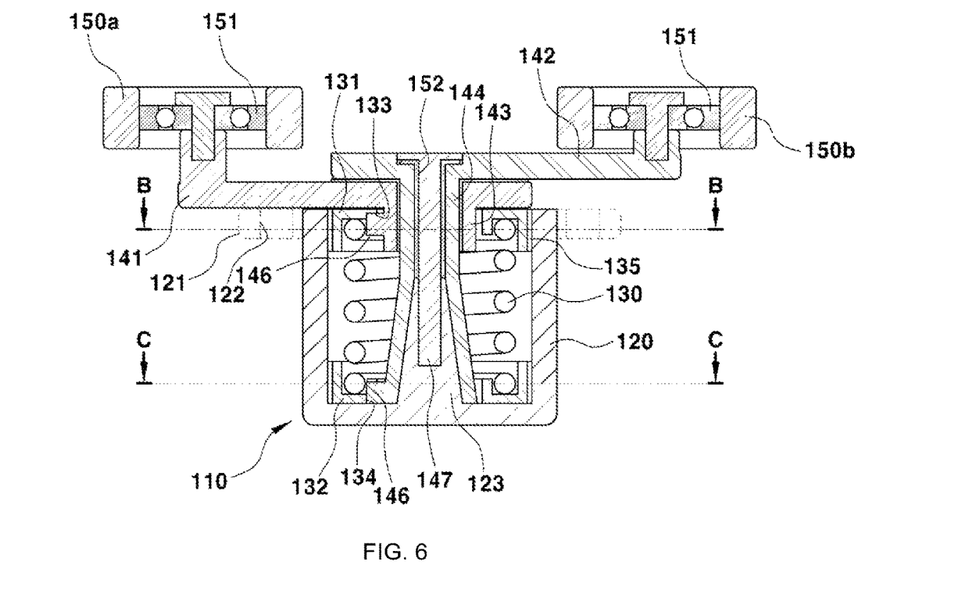
FIG. 6 is a cross-sectional view taken along line A-A of FIG. 5.
Figure 7A:
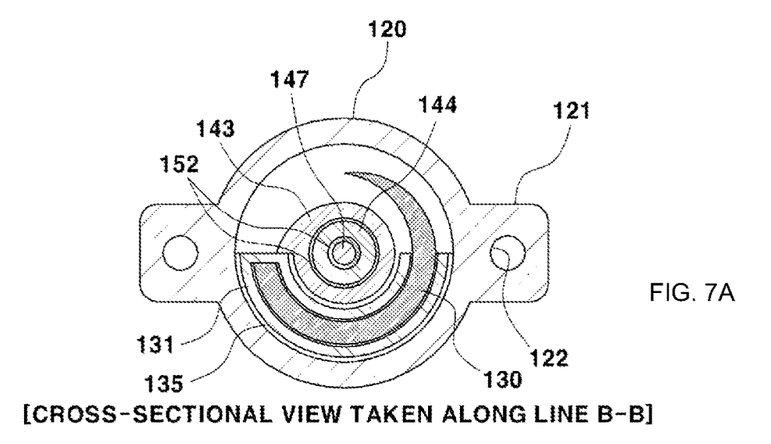
FIGS. 7A and 7B are cross-sectional views taken along lines B-B and C-C of FIG. 6, respectively.
Figure 7B:
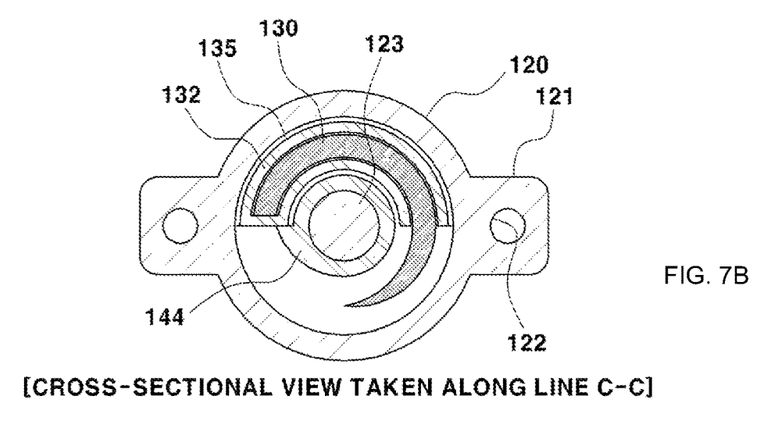

FIG. 6 is a cross-sectional view taken along line A-A of FIG. 5, and FIGS. 7A and 7B are cross-sectional views taken along lines B-B and C-C of FIG. 6, respectively.

Referring to FIG. 4, as pulleys positioned at the front side of the engine, a crank pulley 11 mounted on a crank shaft C/S, a compressor pulley 12 mounted on an air conditioner compressor A/C, and a hybrid starter and generator pulley 14 mounted on a hybrid starter and generator (HSG) are illustrated.

The pulleys 11, 12, and 14 are connected to be able to transmit power to each other through a belt 15, and rotational force of the engine is transmitted from the crank pulley 11 to the compressor pulley 12 and the hybrid starter and generator pulley 14 through the belt 15, or rotational force of the hybrid starter and generator is transmitted from the hybrid starter and generator pulley 14 to the crank pulley 11 and the compressor pulley 12 through the belt 15.

In this case, the automatic tensioner 110 of the exemplary embodiment is mounted at the front side of the engine and automatically adjusts and maintains tension of the belt while supporting the belt 15, and has two arms 141 and 142 which are relatively and elastically rotated around a single pivot point based on a state of tension of the belt 15 (that is, tightened and released states), and idlers 150 each of which is mounted at one end of each of the arms 141 and 142 and supports the belt 15.

Here, the idler 150 is also called a tensioner pulley or a tensioner wheel, and mounted at an end of each of the arms 141 and 142 so as to be supported by a bearing 151.

When the belt 15 circulates between the pulleys 11, 12, and 14 of components of the auxiliary machinery, the idlers 150 support the belt while being rotated by the belt in a state in which the idlers 150 are in contact with the belt 15.

As illustrated in FIG. 6, the automatic tensioner 110 of the present disclosure includes a tensioner body 120 which is a body portion to which the respective components are mounted and supported, and fixedly mounted at the front side of the engine.

The tensioner body 120 may be manufactured in a cylindrical shape that has an internal space that may accommodate the components such as a tension spring 130, and damping shoes 131 and 132, fastening portions 121 may be formed at both lateral sides of the tensioner body 120 so as to be fastened to the engine side, and the fastening portions 121 may be fixedly mounted to the engine side through fastening holes 122 by bolting.

The automatic tensioner 110 of the present disclosure may include the tension spring 130 installed in the internal space of the tensioner body 120, and the tension spring 130 may be a coil spring as illustrated.

In this case, as illustrated in FIG. 6, both ends of the tension spring 130 are positioned at the upper side and the lower side in the internal space of the tensioner body 120, and the damping shoes 131 and 132, which are positioned in the internal space of the tensioner body 120, are coupled to the ends of the tension spring 130.

Both ends of the tension spring 130 are connected to the arms 141 and 142 through the damping shoes 131 and 132, respectively, and the tension spring 130 applies spring force and elastic restoring force, and provides tension of the belt 15 through the damping shoes 131 and 132, the arms 141 and 142, and the idlers 150.

The automatic tensioner 110 of the present disclosure has the two arms 141 and 142 that have the same rotation center (pivot point), and the two arms 141 and 142 are coupled to form a nearly V shape while having a single common pivot point.

The idler 150, which is in contact with the auxiliary machinery belt 15 and has the bearing 151 interposed therein, is rotatably mounted at one end of each of the two arms 141 and 142, and a hinge portion 143 or 144, which is a portion that is coupled to the tension spring 130 and becomes a rotation center (pivot point) of each of the arms 141 and 142, protrude at the other end of each of the two arms 141 and 142.

Hereinafter, in the present specification, one arm of the two arms is referred to as a first arm 141, and the other arm is referred to as a second arm 142.

One end of the first arm 141 is situated, by means of the first damping shoe 131, on the upper side of the internal space of the tensioner body as illustrated in FIG. 6 (and also the end of the first arm is between both ends of the tension spring 130), and one end of the second arm 142 is situated, by means of the second damping shoe 132, on the lower side of the internal space of the tensioner body as illustrated in FIG. 6.

The first damping shoe 131 and the second damping shoe 132 are formed in a ring shape and fixedly installed at both ends of the tension spring 130, and serve to transmit and receive force between the arms 141 and 142 and the tension spring 130. The hinge portions 143 and 144 of the arms 141 and 142 are coupled to inner circumferential surfaces of the damping shoes 131 and 132, respectively, and outer circumferential surfaces of the damping shoes 131 and 132 are supported on an inner surface of the tensioner body 120 while having damping materials 135 therebetween as described below.

The first damping shoe 131 is coupled to the hinge portion 143 of the first arm 141 so as to be moved integrally with the first arm 141 when the first arm 141 is rotated or moved in a lateral direction, and the second damping shoe 132 is also coupled to the hinge portion 144 of the second arm 142 so as to be moved integrally with the second arm 142 when the second arm 142 is rotated or moved in the lateral direction.

In order to allow the hinge portion 143 of the first arm 141 and the hinge portion 144 of the second arm 142, which are concentrically disposed as described above, to be moved integrally with the first damping shoe 131 and the second damping shoe 132, respectively, a protrusion 145 formed on the hinge portion 143 of the first arm 141 is coupled to a groove 133 formed in an inner circumferential surface of the first damping shoe 131 so as to be caught by the groove 133, and a protrusion 146 formed on the hinge portion 144 of the second arm 142 is coupled to a groove 134 formed in an inner circumferential surface of the second damping shoe 132 so as to be caught by the groove 134.

Therefore, the first arm 141 and the second arm 142 may receive force from the tension spring 130 through the damping shoes 131 and 132 to form tension of the belt 15, or on the contrary, the first arm 141 and the second arm 142 may transmit tension of the belt 15 to the tension spring 130.

The hinge portions 143 and 144 of the respective arms 141 and 142 protrude in cylindrical shapes at centers of ends of the arms so as to be inserted into the internal space of the tensioner body 120, and the hinge portions 143 and 144 of the two arms are coupled at the inside and the outside thereof so as to be concentrically disposed. In this case, the hinge portions 143 and 144 become a rotation center (pivot point) of the two arms 141 and 142 that are relatively rotated.

In this case, since the hinge portion 144 of the second arm 142 is coupled to the second damping shoe 132 at a portion opposite to the second arm 142 based on the tension spring 130, that is, at a lower end of the internal space of the tensioner body 120, the hinge portion 144 of the second arm 142 protrudes in a shape that may penetrate the inside of the tension spring 130, more particularly, in a shape that may be inserted to be elongated along a central portion of the internal space of the tensioner body 120.

The hinge portions 143 and 144 of the two arms 141 and 142 and the tensioner body 120 are coupled and maintained by a pivot pin 147 that is fastened between the hinge portions 143 and 144 and the tensioner body 120 at a position of the rotation center of the arms, and when the two arms 141 and 142 are relatively rotated, the hinge portions 143 and 144 of the two arms are also relatively rotated about the pivot pin 147 fastened to the tensioner body 120.

In a state in which the hinge portions 143 and 144 of the two arms 141 and 142 are coupled to each other, the pivot pin 147 is inserted to be elongated into the hinge portion 144 that is positioned inward between the two hinge portions, that is, toward the inside of the hinge portion 144 of the second arm 142, and then fastened to a pin coupling portion 123 of the tensioner body 120.

In this case, the pin coupling portion 123 may protrude upward from a bottom of the tensioner body 120 to have a shape that is inserted into the hinge portion 144 of the second arm 142 which is positioned inward between the two hinge portions 143 and 144.

The first damping shoe 131 fixed to one end of the tension spring 130 and the second damping shoe 132 fixed to the opposite end of the tension spring 130 are supported by an upper portion and a lower portion of the inner surface of the tensioner body 120 in a lateral direction, respectively, while being supported by the tension spring 130. In this case, the damping materials 135 are interposed between the damping shoes 131 and 132 and the inner surface of the tensioner body 120.

The damping materials 135 are attached to the outer circumferential surfaces of the damping shoes 131 and 132, and serve to generate damping force through friction with the inner surface of the tensioner body 120 when the arms 141 and 142 are moved.

A bushing 152 is interposed between the first arm 141, the second arm 142, and the pivot pin 147 to maintain a gap between the first arm 141, the second arm 142, and the pivot pin 147 and reduce friction when the first arm 141, the second arm 142, and the pivot pin 147 are relatively moved.

As described above, the configuration of the automatic tensioner according to the exemplary embodiment of the present disclosure has been described. In a case in which the automatic tensioner 110 of the aforementioned exemplary embodiment is applied, it is possible to adjust and maintain tension of the auxiliary machinery belt by using the single mechanical automatic tensioner in the engine of the hybrid vehicle to which the hybrid starter and generator is attached.

According to the automatic tensioner 110 of the aforementioned exemplary embodiment, the two arms 141 and 142 adjust tension of the belt 15 while being relatively moved based on the single tensioner body 120 and the single pivot point (position of the pivot pin), and in this case, the arms 141 and 142 support both ends of the tension spring 130 through the damping shoes 131 and 132.

In particular, the arms 141 and 142 transmit tension of the belt 15 to the tension spring 130 through the damping shoes 131 and 132, or transmit force of the tension spring 130 to the belt 15, thereby properly maintaining a change in tension of the belt which is caused when the belt is placed at different positions.

Since the damping materials 135 are attached to the surfaces of the damping shoes 131 and 132, the damping materials 135 generate damping force through friction when the damping shoes are relatively moved while being supported on the inner surface of the tensioner body 120 through the damping materials 135.

The damping shoes 131 and 132 generate higher damping force than the damping materials 135, and serve to increase durability.

FIGS. 8 to 11 are views for explaining an operating mechanism of the automatic tensioner according to the present disclosure. In a general engine vehicle that uses only the engine as a driving source, the hybrid starter and generator pulley 14 in the drawings may be substituted by an alternator pulley, and in this case, the alternator pulley receives rotational force that is transmitted from the crank pulley 11 through the belt 15, and the alternator generates electricity.

In a case in which reference numeral 14 indicates the alternator pulley as described above, a separate starter (not illustrated in the drawings) is provided to start the engine. In a case in which reference numeral 14 is a hybrid starter and generator (HSG) pulley of the hybrid vehicle, a separate backup starter, which serves to start the engine when the hybrid starter and generator is broken down, is generally provided.

Figure 8:
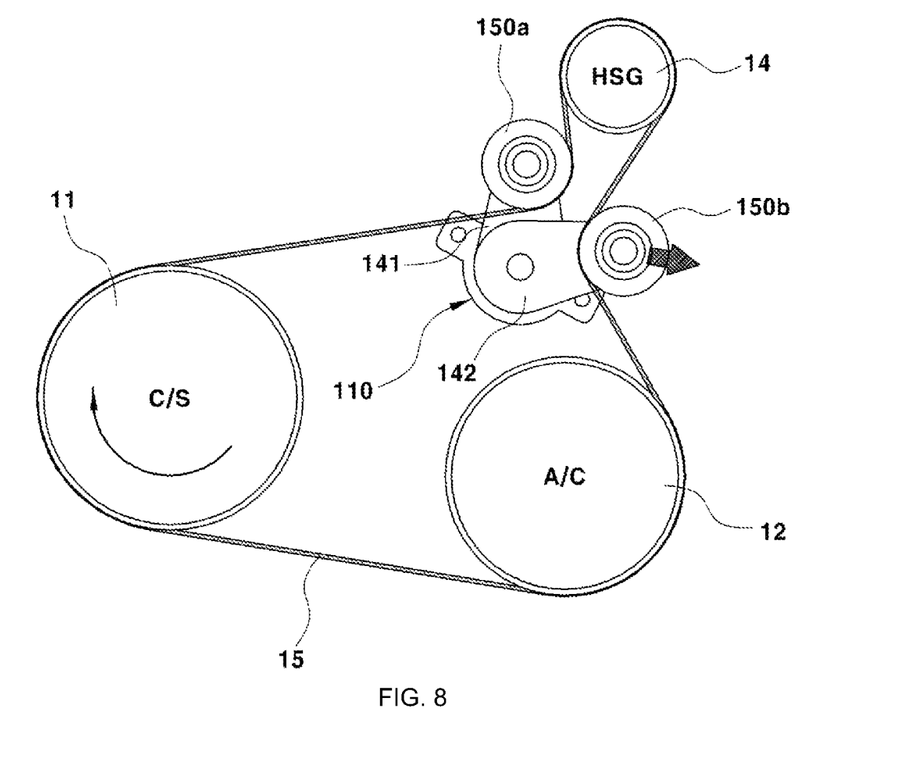
FIGS. 8 to 11 are views illustrating an operating state of the automatic tensioner according to the present disclosure.

When describing the state in FIG. 8 in consideration of the aforementioned configurations, the state in FIG. 8 indicates a state in which when the engine is started by the separate starter or the backup starter, rotational force is transmitted from the crank pulley 11 to the hybrid starter and generator (HSG) or the alternator through the belt 15, or indicates a state in which rotational force of the engine is transmitted from the crank pulley 11 to the hybrid starter and generator or the alternator through the belt 15, and power generation (including an operation of charging a battery, and a regeneration operation) is carried out.

Figure 9:
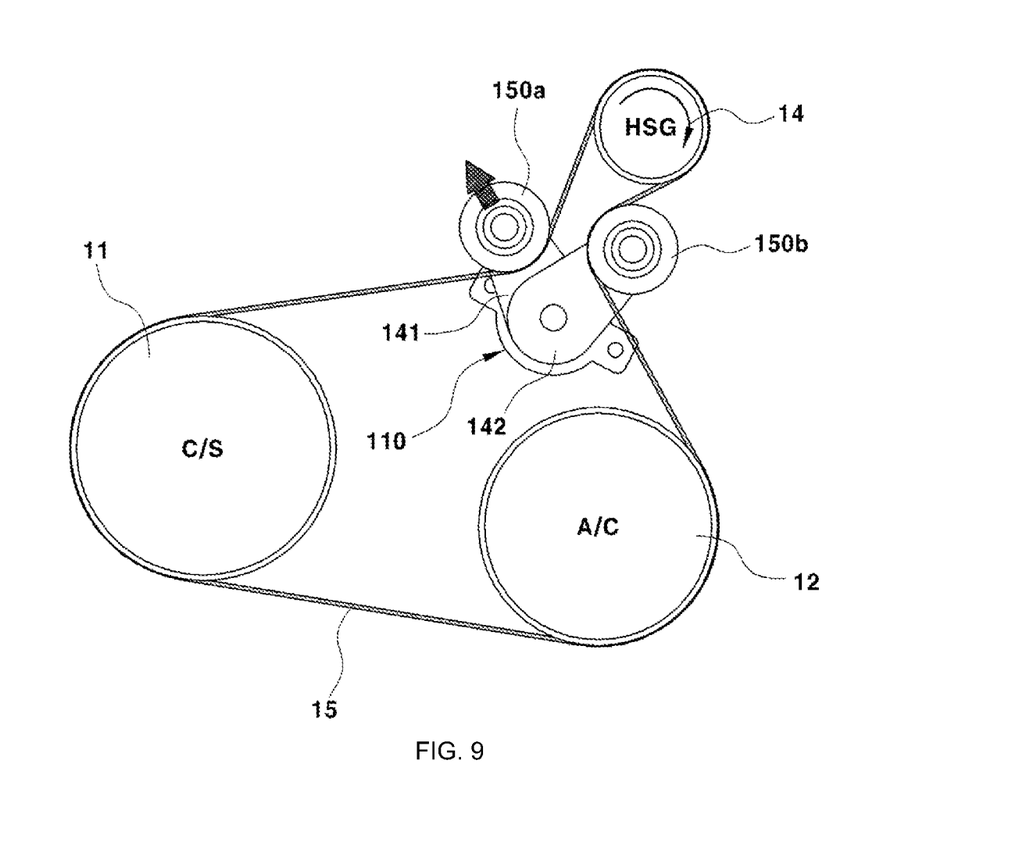

The state in FIG. 9 indicates an engine starting state in which the hybrid starter and generator (HSG) is operated and rotational force of the hybrid starter and generator is transmitted to the crank pulley 11 through the belt 15, or a torque boosting state in which when the vehicle travels, the hybrid starter and generator is operated, and rotational force of the hybrid starter and generator is transmitted to the crank pulley 11 through the belt 15.

Here, the torque boosting provides driving torque for driving the vehicle using output torque of the hybrid starter and generator that is operated by the motor when the vehicle travels, and the vehicle travels while the output torque of the hybrid starter and generator supplements the output torque of the engine.

Figure 10:
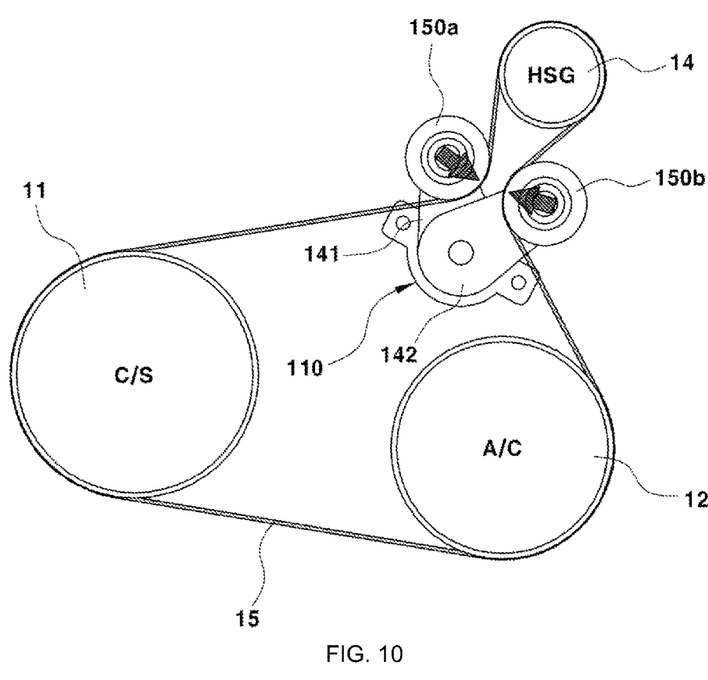
Figure 11:
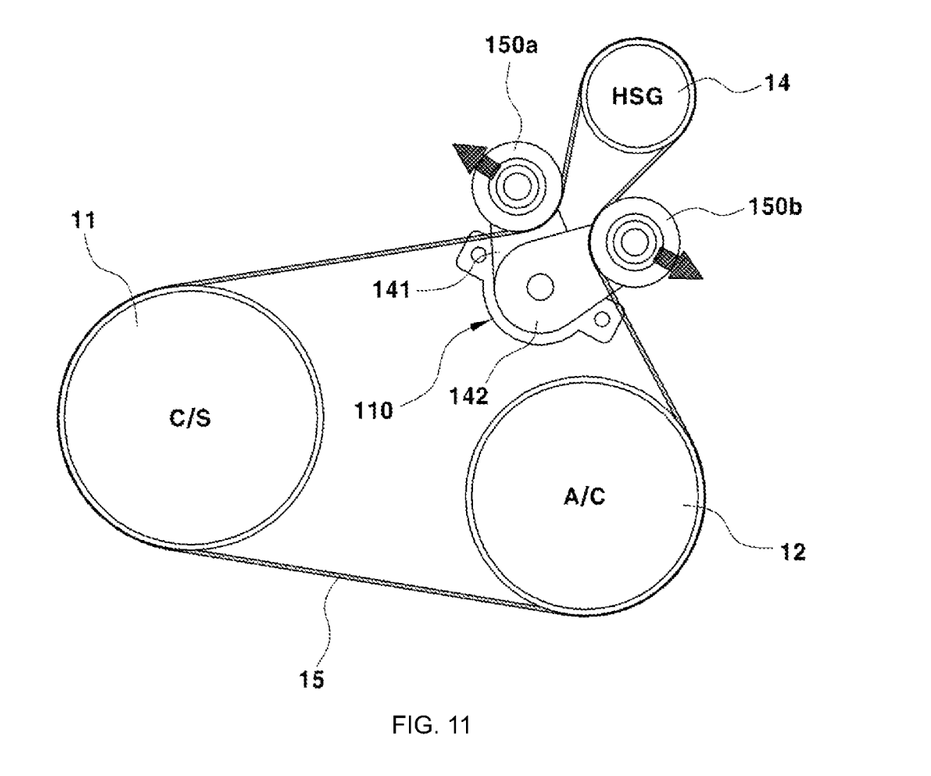

FIGS. 10 and 11 illustrate an operation of the automatic tensioner 110 in response to a change in tension of the auxiliary machinery belt 15 while operating the engine.

Accordingly, according to the automatic tensioner of the present disclosure, it is possible to configure a hybrid starter and generator (HSG) system by using the single automatic tensioner, and thereby improving fuel efficiency of the vehicle by reducing tension of the belt in comparison with a case in which two tensioners are used.

Since the single automatic tensioner may be applied, a mounting position is less restricted, the automatic tensioner may be easily adapted to the current system, and the automatic tensioner may be tuned to match with layouts of various belt system by adjusting a length of the arm.

Since a structure, a shape, and a configuration are simple and the number of components is small, it is possible to reduce a weight, and to reduce manufacturing costs such as material costs and processing costs.

Since damping force is maintained by the two damping shoes, it is possible to reduce damping force and solve the problems in respect to belt noise.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An automatic belt tensioner for an engine, which automatically adjusts tension of a belt for transmitting rotational force between an engine and an auxiliary machinery component, the automatic belt tensioner comprising:

a tensioner body which is mounted on a side of the engine and has an internal space;

a tension spring which is in the form of a coil spring and installed in the internal space of the tensioner body;

a first damping shoe and a second damping shoe which are coupled to a first end and second end of the tension spring, respectively;

a first arm which has a first hinge portion that is formed at a first end of the first arm and coupled to the first damping shoe;

a second arm which has a second hinge portion that is formed at first end of the second arm and coupled to the second damping shoe; and idlers rotatably mounted on the first arm and the second arm, respectively, and supporting the belt, wherein the first hinge portion which is a rotation center of the first arm and the second hinge portion which is a rotation center of the second arm are rotatably coupled to the tensioner body in a state in which the first hinge portion and the second hinge portion are concentrically disposed.

2. The automatic belt tensioner according to claim 1, wherein the first arm and the second arm have a single common pivot point that uses the first hinge portion and the second hinge portion as a rotation center, and are disposed in a V shape, and the idler is mounted at a second end of each of the first and second arms.

3. The automatic belt tensioner according to claim 1, wherein the first hinge portion of the first arm and the second hinge portion of the second arm protrude in a cylindrical shape so as to be inserted into the internal space of the tensioner body from one end of each of the first and second arms, and coupled to each other at an inside and an outside thereof so as to be concentrically disposed.

4. The automatic belt tensioner according to claim 3, wherein a pivot pin, which is inserted into at least one of the first and second hinge portions that is positioned inward in a state in which the first hinge portion of the first arm and the second hinge portion of the second arm are coupled at the inside and the outside thereof, is fastened to a pin coupling portion of the tensioner body, and the first hinge portion of the first arm and the second hinge portion of the second arm are relatively rotated about the pivot pin.

5. The automatic belt tensioner according to claim 4, wherein the pin coupling portion protrudes upward from a bottom of the tensioner body and has a shape adapted to be inserted into at least one of the first and second hinge portions that is positioned inward.

6. The automatic belt tensioner according to claim 4, wherein a bushing for reducing friction is interposed between the at least one of the first and second hinge portions, which is positioned inward, and the pivot pin.

7. The automatic belt tensioner according to claim 3, wherein the first hinge portion of the first arm is coupled to the first damping shoe that is positioned at an upper side in the internal space of the tensioner body, and the second hinge portion of the second arm passes through the inside of the tension spring and is coupled to the second damping shoe at a lower end of the internal space of the tensioner body.

8. The automatic belt tensioner according to claim 1 or 7, wherein a protrusion formed on the first hinge portion of the first arm is coupled to a first groove formed in an inner circumferential surface of the first damping shoe so as to be caught by the first groove, and a protrusion formed on the second hinge portion of the second arm is coupled to a second groove formed in an inner circumferential surface of the second damping shoe so as to be caught by the second groove.

9. The automatic belt tensioner according to claim 1, wherein the first damping shoe and the second damping shoe are formed in a ring shape, each of the first and second hinge portions of the first and second arms is coupled to an corresponding inner circumferential surface of the first and second damping shoe, and an outer circumferential surface of the first and second damping shoes is supported on an inner surface of the tensioner body.

10. The automatic belt tensioner according to claim 9, wherein a damping material is interposed between the outer circumferential surface of the first damping shoe and the inner surface of the tensioner body and between the outer circumferential surface of the second damping shoe and the inner surface of the tensioner body.

11. The automatic belt tensioner according to claim 10, wherein the damping material is attached to the outer circumferential surface of the first and second damping shoes.

12. The automatic belt tensioner according to claim 1, wherein a bushing is interposed between the first arm and the second arm so as to maintain a gap between the first arm and the second arm and reduce friction when the first arm and the second arm are relatively moved.

13. The automatic belt tensioner according to claim 1, wherein the engine is an engine for a hybrid vehicle.

14. The automatic belt tensioner according to claim 1, wherein the auxiliary machinery belt is a belt that is connected between a crank pulley of the engine and a pulley of a hybrid starter and generator (HSG) so as to transmit power therebetween.

15. An automatic belt tensioner for an engine, comprising:
a tensioner body mounted on one side of the engine and forming an internal space;
a tension spring installed in the internal space of the tensioner body;
a first damping shoe coupled to a first end of the tension spring;
a second damping shoe coupled to a second end of the tension spring;
a first arm comprising a first hinge portion formed at a first end of the first arm and coupled to the first damping shoe;
a second arm comprising a second hinge portion formed at a first end of the second arm and coupled to the second damping shoe; and
idlers rotatably mounted on the first arm and the second arm, respectively, and supporting the belt,
wherein the first and second hinge portions are concentrically disposed and inserted into the internal space of the tensioner body and rotatably coupled to the tensioner body.

* * * * *